W. M. GROSS.
END GATE.
APPLICATION FILED OCT. 21, 1919.
1,367,377.
Patented Feb. 1, 1921.
2 SHEETS—SHEET 2.
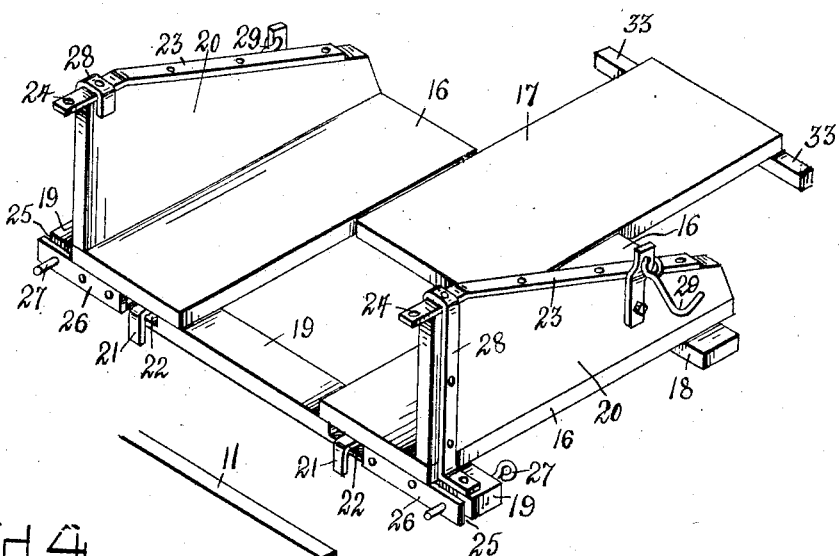
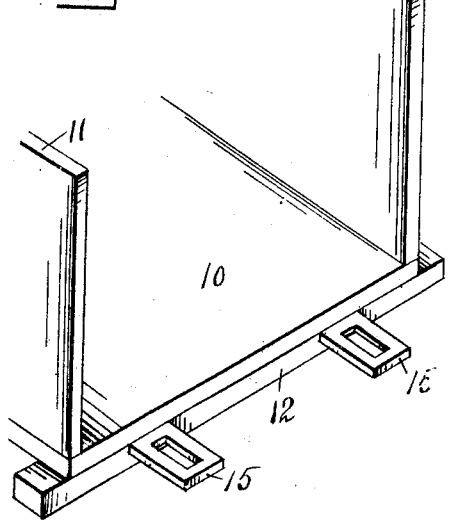
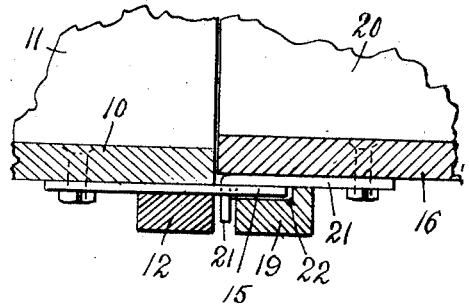
Inventor
WILLIAM M. GROSS.
By Geo. P. Kimmel
Attorney

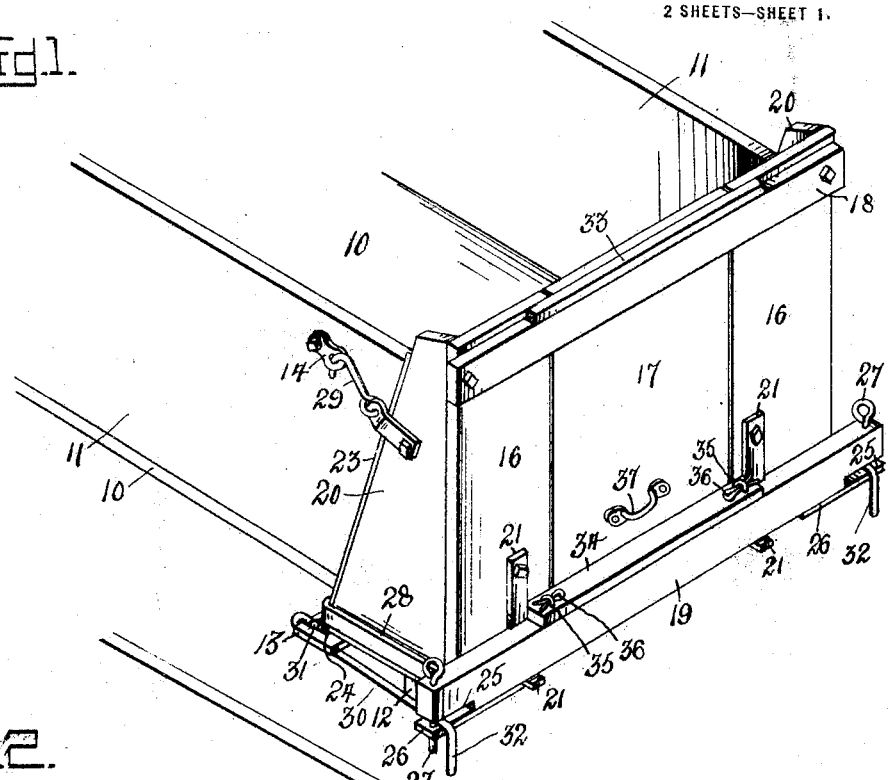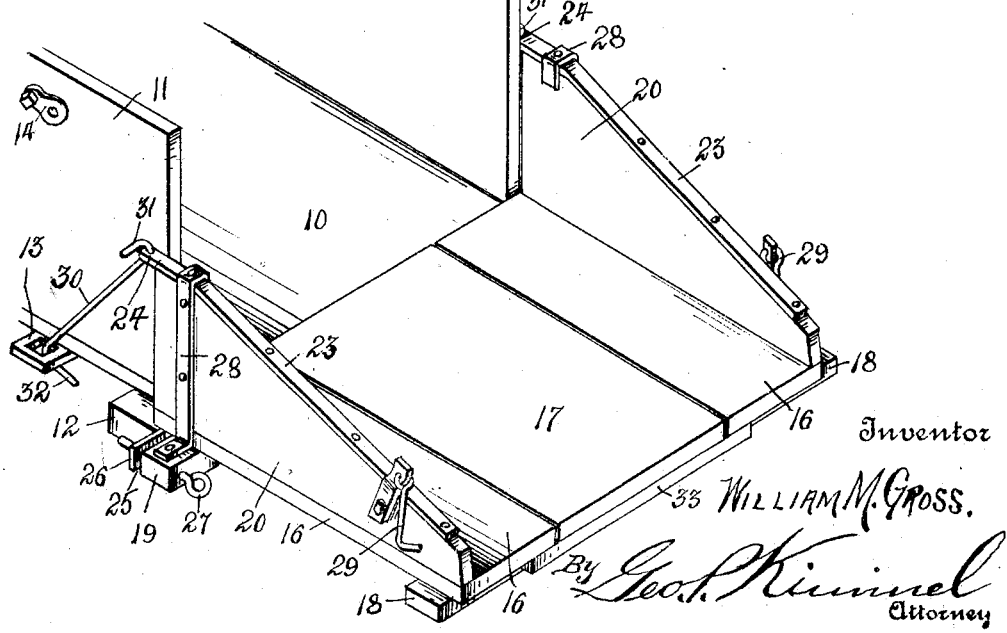

UNITED STATES PATENT OFFICE.

WILLIAM M. GROSS, OF BRECKENRIDGE, MISSOURI.

END-GATE.

1,367,377.    Specification of Letters Patent.    Patented Feb. 1, 1921.

Application filed October 21, 1919. Serial No. 332,333.

*To all whom it may concern:*

Be it known that I, WILLIAM M. GROSS, a citizen of the United States, residing at Breckenridge, in the county of Caldwell and State of Missouri, have invented certain new and useful Improvements in End-Gates, of which the following is a specification.

This invention relates to combined end gates and shovel boards for wagon bodies, and has for one of its objects to improve the construction and increase the efficiency and utility of devices of this character.

Another object of the invention is to provide a device of this character having means whereby one pair of rods are utilized to hold the device in closed position when employed as an end gate or in open position when employed as a shovel board.

Another object of the invention is to provide a device of this character having means whereby the device may be arranged as a live stock carrier.

With these and other objects in view the invention consists in certain novel features of construction as hereinafter shown and then specifically pointed out in the claims, and in the drawings illustrative of the preferred embodiment of the invention.

Figure 1 is a perspective view of the improved device, arranged as an end gate.

Fig. 2 is a perspective view of the improved device arranged as a shovel board.

Fig. 3 is a detached perspective view from the inner end of the combined end gate and shovel board.

Fig. 4 is a perspective view of the rear end of the wagon body without the combined end gate and shovel board.

Fig. 5 is an enlarged sectional detail illustrating the construction of the hinged coupling between the wagon body and the combined end gate and shovel board.

The improved device may be adapted without material structural change to wagon bodies or boxes of various forms and sizes, and including generally a bottom member 10 side portions 11 and a rear transverse sill member 12, the latter extending at its ends beyond the sides 11, as shown.

Attached to the bottom 10 of the body are perforated socket devices, one of which is shown at 13, and spaced from the rear end, and attached to the sides 11 near the upper edges are other perforated socket devices or eyes, one of which is shown at 14.

Attached to the bottom 10 and extending rearwardly thereof are other sockets 15 in spaced relation, with the perforations therethrough elongated, as shown.

The combined end gate and shovel board comprises a bottom member preferably formed in three portions, stationary side portions 16 and movable central or panel portions 17, the portions 16 being connected by transverse sill members or cleats 18—19. The combined end gate and shovel board likewise includes side portions or wings 20 tapering or reduced toward their rear ends. The bottom 16—17 is of greater width than the bottom 10 of the body so that when disposed in closed position as shown in Fig. 1 the side or wing members 20 will extend over the rear portions of the sides 11.

Attached to the bottom members 16 are hook shaped devices 21 designed to engage in the elongated openings of the socket devices 15 and thus hingedly unite the combined end gate and shovel board to the body. The sill member 19 is formed with a cavity 22 opposite each of the hook devices 21 to receive the socket devices 15 when the improved attachment is arranged as a shovel board with the forward edges of the members 16 and 17 in contact with the rear edge of the bottom 10 of the body, as shown in Fig. 5, to form an effectual lock to prevent upward movement of the attachment.

Attached to the upper edges of the wings 20 are straps 23 extending at their forward ends in advance of the forward ends of the wings and perforated to form eyes 24.

At its ends the sill member 19 is recessed as shown at 25 and provided with guard plates 26 extending over the recesses. The sill member and the guard plates are perforated to receive pins or rods 27 extending transversely of the recesses.

The sill member 19 and the wings 20 are reinforced by straps 28 bent at their upper ends over the straps 23 and at their lower ends over the projecting portions of the sill member 19, and secured in place by rivets, bolts or other suitable fastening devices.

If required the wings 20 may be provided with swinging hooks 29 to engage in the sockets 14 when the device is closed as shown in Fig. 1.

Holding rods 30 having hooked terminals 31—32 are provided and employed to hold the improved device either in closed or open position. When the improved device is arranged in closed position, as shown in Fig. 1, the eyes 24 pass through relatively large openings in the socket devices 13, and the rods 30 passed through the eyes 24 of the straps 23, and beneath the socket members 13 with the hooks 32 bearing over the forward edges of the latter as shown in Fig. 1. The rods are then disposed within the recesses 25 and the pins 27 inserted to retain them in position.

By this means the device is firmly held in closed position, but may be quickly released by withdrawing the pins 27 and moving the hooked portions 32 of the rods outwardly free from the recesses 25 and permitting the rods to drop and hang loosely by the hooks 31 from the eyes 24.

The device can then be moved into open position and drawing the hooks 31 of the rods 30, through the large openings in the member 13 until the hooks 32 engage the socket devices 13 as shown in Fig. 2.

By forming the openings in the socket devices 13 large enough to permit the hooks 31 to pass therethrough when the shovel board is moved into open position, it will not be necessary to entirely remove the rods from the device.

When the rods 30 are arranged as shown in Fig. 2 to hold the device in open position the forward edges of the device will be firmly held with the adjacent ends of the members 16 and 17 in contact with the rear edge of the bottom 10 of the body and the free ends of the socket devices 15 within the cavities 22 and beneath the members 16 and thereby prevented from vertical displacement.

The upper or inner faces of the members 16 and 17 are maintained a short distance above the line of the bottom 10 as shown in Fig. 5, when the device is arranged as a shovel board, to prevent the shovel from catching against the rear edge of the bottom 10.

Attached to the outer end of the panel member 17 is a cleat 33 bearing upon the outer face of the sill member 18 and extended at the ends over the adjacent portions of stationary members 16, and attached to the member 17 near its inner end is another cleat 34 bearing upon the inner face of the sill member 19 and extended at the ends over the adjacent portions of the members 16. The sill member 19 is provided with eye bolts 35 which extend through openings in the cleat 34 and adapted to receive cotter pins 36 or like holding devices.

By this means the member 17 is supported in position between the members 16, when the device is used as an end gate or shovel board, and readily removable when the body is to be used as a stock carrier, to provide ready means for the ingress or egress of the animals.

The member 17 is preferably provided with a suitable lifting handle 37.

The improved device is simple in construction, can be cheaply constructed and adapted to various forms and sizes of wagon bodies, as will be obvious.

While the various details of the construction have been specifically described and illustrated it will be understood that various changes and modifications within the scope of the claims may be made without departing from the spirit of the invention or sacrificing any of its advantages.

What is claimed is:

1. In a device of the character described, a wagon body including bottom and side members, perforated sockets extending rearwardly from the bottom member, perforated sockets extending laterally from the bottom member and spaced from the rear edge, a combined end gate and shovel board including a bottom and side members, a cleat connecting the side members of the end gate and shovel board and extending beyond the same and the extended portions recessed, catch devices carried by the end gate and engaging the rearwardly directed sockets, eye devices extending from the end gate and engageable through the laterally directed sockets when the device is arranged as an end gate, rods having terminal hooks, one of which is engageable through the eyes beneath the lateral socket devices and the other hook engageable in the recess in the cleat, and means for locking the rods in the cleat recesses.

2. A combined end gate and shovel board including a bottom having transverse cleats at the ends, one of said cleats having outwardly opening recesses, catch devices carried by the combined end gate and shovel board and including terminal hooks extending respectively into said recesses, in combination with a wagon body including a bottom portion, socket devices carried by said wagon body and adapted to enter the recesses and having elongated openings to receive the hooked catch devices, and means for supporting the combined end gate and shovel board in position relatively to the wagon body and drawing the same in close proximity thereto.

In testimony whereof, I have hereunto affixed my signature.

WILLIAM M. GROSS.